Patented Aug. 27, 1929.

1,726,265

UNITED STATES PATENT OFFICE.

WILHELM HERZBERG, OF BERLIN, AND GERHARD HOPPE, OF BERLIN-TREPTOW, GERMANY, ASSIGNORS, BY MESNE ASSIGNMENTS, TO GENERAL ANILINE WORKS, INC., OF NEW YORK, N. Y., A CORPORATION OF DELAWARE.

NEW THIAZOLE DERIVATIVES OF 1.4 NAPHTHOQUINONE.

No Drawing. Application filed December 28, 1926, Serial No. 157,607, and in Germany November 28, 1925.

Our invention relates to new thiazole derivatives of 1.4-naphthoquinone, represented by the formlua:

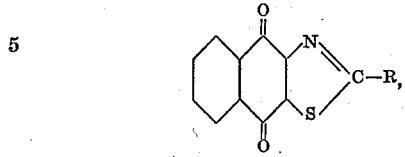

R being an organic radical. These thiazole derivatives may be obtained by condensing 2-amino-3-mercapto-1.4-naphthoquinone with an aldehyde, such as acetaldehyde, glyoxal, benzaldehyde, naphthaldehyde, terephthalaldehyde. The yellow thiazole derivatives are soluble in concentrated sulfuric acid with a yellowish color. They yield with sodium hydrosulfite in the presence of a strong alkaline agent a vat, from which cotton is dyed yellow tints.

The condensation of 2-amino-3-mercapto-1.4-naphthoquinone with aldehydes occurs very smoothly, most simply in aqueous suspension. There is first obtained an intermediate product which evidently passes extraordinarily easily into a thiazole by action of atmospheric oxygen. These intermediate products may be used directly in dyeing as they are converted into the vat of the finished dye by treatment with alkali and hydrosulfite.

The following example, the parts being by weight, illustrates the invention without limiting it:

To the blue solution of 2-amino-3-mercapto-1.4-naphthoquinone, obtained by gently warming 22 parts of 2-amino-3-chloro-1.4-naphthoquinone with 25 parts of crystallized sodium sulfide in 120 parts of water, 12 parts of benzaldehyde are added, the whole is made feebly acid with acetic acid and then heated for 1 hour to boiling while stirring. The brown amorphous matter which first separates is thus converted into a yellow crystalline body. This product, recrystallized from glacial acetic acid, forms greenish yellow needles which decompose at 225 to 230° C. It corresponds probably to the formula:

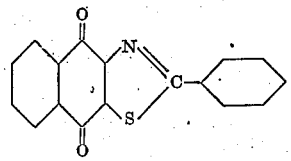

When gently warmed with dilute sodium hydroxide solution it dissolves in part to a blue-red solution; by adding sodium hydrosulfite the solution is complete. From this solution oxidation with air precipitates the dye. The product first obtained is advantageously further worked up by dissolving it in about 50 parts of water, 1 part of sodium hydroxide solution of 35° Bé. and 1 part of sodium hydrosulfite and then introducing air. The greenish yellow powder thus obtained crystallizes from glacial acetic acid in the form of yellow needles which melt at 243° C. From its blue-red vat cotton is dyed a greenish yellow, which is fast to chlorine and soap.

The compounds derived from 2 mols of 2-amino-3-mercapto-1.4-naphthoquinone and 1 mol of a dialdehyde contain in their molecule twice the radical

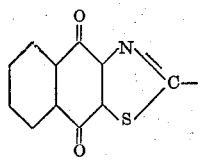

The compound derived from 2-amino-3-mercapto-1.4-naphthoquinone and terephthalaldehyde is soluble in concentrated sulfuric acid with a yellowish color and yields with sodium hydrosulfite and sodium hydroxide a vat from which cotton is dyed yellow tints and corresponds to the probable formula:

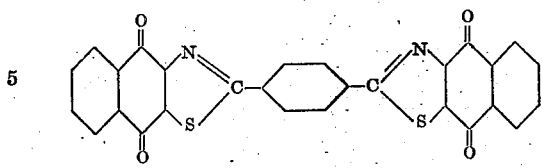

What we claim is:

1. The new thiazole derivatives of 1.4-naphthoquinone, represented by the formula

R being an organic radical, soluble in concentrated sulfuric acid with a yellowish color and yielding with sodium hydrosulfite and sodium hydroxide a vat from which cotton is dyed yellow tints.

2. The new thiazole compounds derived from 2-amino-3-mercapto-1.4-naphthoquinone and an aldehyde, soluble in concentrated sulfuric acid with a yellowish color and yielding with sodium hydrosulfite and sodium hydroxide a vat from which cotton is dyed yellow tints.

3. The new thiazole compounds derived from 2-amino-3-mercapto-1.4-naphthoquinone and an aromatic aldehyde, soluble in concentrated sulfuric acid with a yellowish color and yielding with sodium hydrosulfite and sodium hydroxide a vat from which cotton is dyed yellow tints.

4. The new thiazole compounds derived from 2-amino-3-mercapto-1.4-naphthoquinone and a dialdehyde, soluble in concentrated sulfuric acid with a yellowish color and yielding with sodium hydrosulfite and sodium hydroxide a vat from which cotton is dyed yellow tints, the new compounds containing in their molecule twice the radical

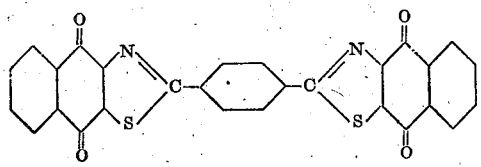

5. The new thiazole compound derived from 2-amino-3-mercapto-1.4-naphthoquinone and terephthalaldehyde, soluble in concentrated sulfuric acid with a yellowish color and yielding with sodium hydrosulfite and sodium hydroxide a vat from which cotton is dyed yellow tints, the new compound corresponding to the formula:

In testimony whereof we affix our signatures.

WILHELM HERZBERG.
GERHARD HOPPE.